May 4, 1926.

J. A. BALL

COLOR CINEMATOGRAPHY

Filed Nov. 2, 1921

J. A. BALL

COLOR CINEMATOGRAPHY

Filed Nov. 2, 1921

J. A. BALL 1,583,108

COLOR CINEMATOGRAPHY

Filed Nov. 2, 1921

Inventor
Joseph A. Ball
by Roberts Roberts & Cushman
his Attorneys

May 4, 1926.

J. A. BALL 1,583,108

COLOR CINEMATOGRAPHY

Filed Nov. 2, 1921   5 Sheets-Sheet 5

Patented May 4, 1926.

UNITED STATES PATENT OFFICE.

JOSEPH A. BALL, OF JAMAICA PLAIN, MASSACHUSETTS, ASSIGNOR, BY MESNE ASSIGNMENTS, TO TECHNICOLOR MOTION PICTURE CORPORATION, OF BOSTON, MASSACHUSETTS, A CORPORATION OF MAINE.

COLOR CINEMATOGRAPHY.

Application filed November 2, 1921. Serial No. 512,399.

*To all whom it may concern:*

Be it known that I, JOSEPH A. BALL, a citizen of the United States of America, and resident of Jamaica Plain, in the county of Suffolk and State of Massachusetts, have invented new and useful Improvements in Color Cinematography, of which the following is a specification.

This invention relates to the production of complemental cinematographic films respectively bearing series of images representing different color aspects of an object field and more particularly to the production of complemental positive films which when placed in superposed registry and suitably colored are adapted to reproduce the object field more or less accurately in natural colors.

The principal objects of the invention are to produce such films rapidly and economically, to expose the respective films simultaneously or at least concomitantly in the same operation or stage of the process, to expose the films in such manner that they may continuously pass into parallel juxtaposition following the printing operation, to facilitate the registration of the films with relation to each other, to control the exposure of the films automatically both with respect to their average exposure and also with respect to their relative exposure, and in general to provide an improved method and apparatus for producing complemental films.

Other objects of the invention are to provide for concomitantly printing a plurality of positive films from a single negative film bearing plural series of complemental negatives, to provide means for advancing and registering the positive films in synchronism, to provide means common to the positive films for advancing and registering same, to increase the shutter efficiency of apparatus using a plurality of beams of light, and to provide means for automatically varying a plurality of printing lights relatively to each other.

The invention comprises feeding a plurality of films along angular paths, the angles of which are adjacent, the paths on one side of the angles extending in parallel juxtaposition or at least in the same general direction, and concomitantly forming complemental series of images on the respective films on the other side of the angles, either by direct exposure to the object field or by printing from one or more negative films bearing complemental images. When the series of negative images are all on the same film the complemental images are preferably reversed with relation to each other, for example with their heads directed in opposite directions longitudinally of the film, as disclosed in Patent No. 1,457,500. In any event the images are preferably formed on the positives in reversed relationship relatively to each other so that their heads are all directed in the same direction when the films pass into parallel juxtaposition as aforesaid.

If the positive images are to be converted into clear gelatin reliefs and subsequently stained different colors, the positive films are preferably printed through the backs so that the exposed portions of the emulsions are located next to the celluloid as disclosed in Pat. No. 1,552,826 applied for on even date herewith. The present invention provides means for accomplishing this and at the same time permitting the films to be brought into parallel juxtaposition back-to-back after which they may be immediately cemented together and subsequently developed as disclosed in application Sr. No. 512,398, filed on even date herewith.

The images of the respective series may be printed (or otherwise exposed) simultaneously or alternately. When exposing simultaneously, each image of a complemental set (a set comprising one image in each series) may be exposed at a time, or one image of one set and series and another image of another set and series, etc., may be exposed at the same time. However, it is imposed that the images printed at the same time (or in immediate succession) represent at least approximately the same time phase of the object field in order that the light for exposing the images of the respective series may be readily controlled to maintain the proper color balance between the images of the respective series. Consequently if the images of each set are not exposed simultaneously they should be exposed in close succession; and when printing one image of one set and series simultaneously with an image of another set and series, the images simultaneously printed should be in adjacent sets and preferably in sets representing succeeding time phases of the object field.

The aforesaid color balance is preferably maintained by automatically controlling the printing of the respective series in response to variations in the negatives, it being understood that the negatives vary in density throughout the length of the film owing to variations in light conditions, speed of the camera, etc. The variations in the negatives may be in the form of recesses in the edges at spaced intervals corresponding to the variations in density. The automatic control preferably comprises means for varying the light for each series in like manner, thereby to regulate the average exposure of the complemental positives, and also means for varying the light for the respective series in different manner, thereby to regulate the relative exposure of the complemental positives without substantially changing the average exposure.

The film gates or openings through which the complemental positives are exposed are preferably adjacent to facilitate the light control and the registration of the positives while being printed, the registering mechanism preferably being at least in part common to the positive films. In order to locate the film gates close together and at the same time shutter the light passing to the respective film gates simultaneously and quickly, the light paths preferably cross intermediate the lights and the film gates, in which case the shutter is located near where the light crosses so as to cover and uncover all the light paths with a minimum loss of time.

In order to illustrate the nature of the invention, one concrete embodiment has been shown in the accompanying drawings, in which,—

Fig. 15 is a similar view showing still another method of printing.

Figure 1:
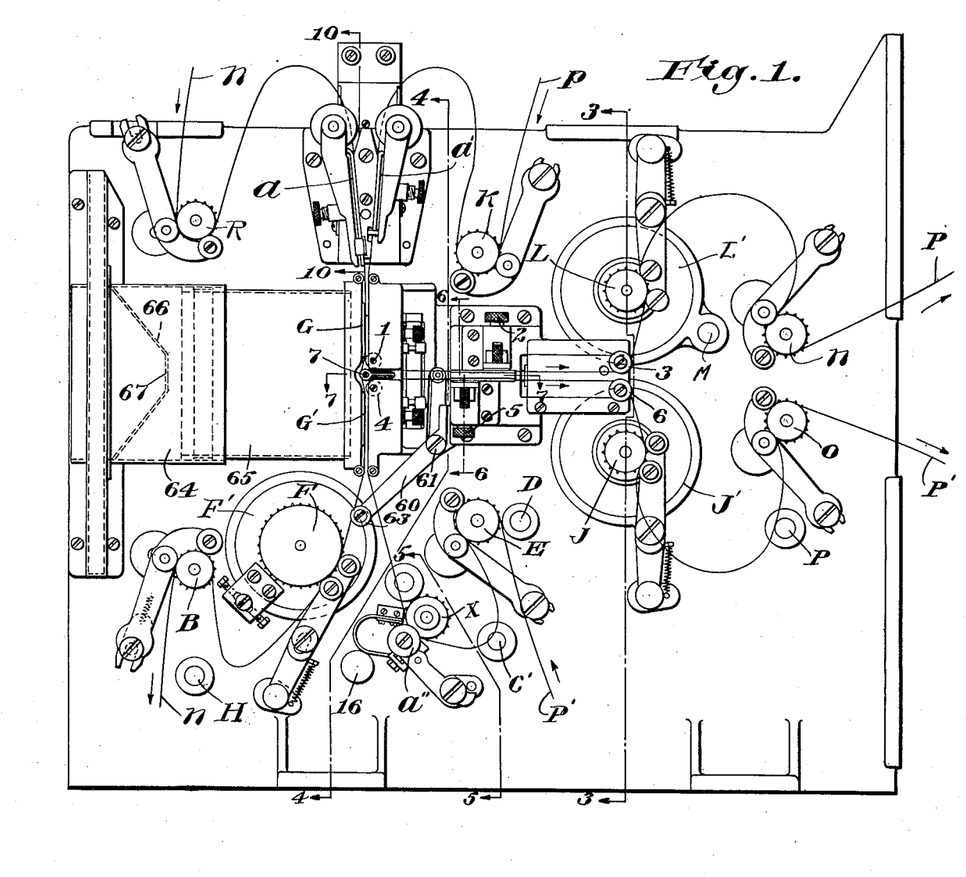
Fig. 1 is a front elevation of the principal parts of a printer embodying the invention.
Figure 8:
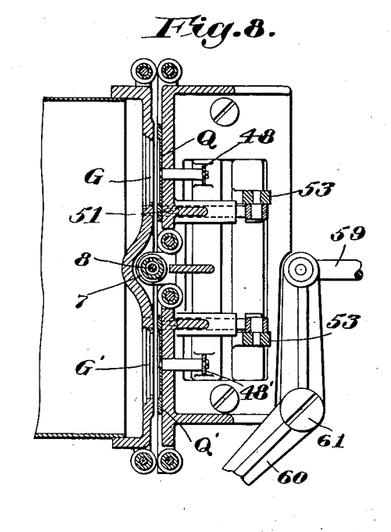
Fig. 8 is a section on line 8—8 of Fig. 7.

The particular embodiment of the invention chosen for the purpose of illustration is adapted to print from one negative N simultaneously upon separate positives P and P', the negative bearing two series of complemental images, one series being printed on positive P and the other series being printed on positive P'. The negative film is fed from a suitable feed reel (not shown) downwardly over sprocket wheel R, thence through film tensioning means A, thence through film-gates G and G', thence downwardly over sprocket wheel F, thence over sprocket wheel B, and thence to the take-up reel (not shown). Between the film-gates G and G' a roller 7 is mounted on an eccentric shaft 8, as shown in Fig. 8, so that by rotating the shaft 8, the path of the film between the two film-gates may be shortened or lengthened at will to bring the images of the negative into approximate registration with the respective film-gates. The positive film P is fed downwardly from a feed roll (not shown) over sprocket wheel K, thence through film tensioning means A', thence through film-gate G, thence over roller 1, thence under perforator 2 sliding in opening 2', thence over roller 3, sprocket wheel L, sprocket wheel N, and thence to the take-up reel (not shown). The positive film P' is fed upwardly from a feed reel (not shown) over sprocket wheel E, thence over sprocket wheel X which is frictionally retarded by film tensioning means A'', through film-gate G', thence over roller 4, under perforator 5 sliding in opening 5' over roller 6, sprocket wheel J, sprocket wheel O, and thence to a take-up reel (not shown).

Figure 2:
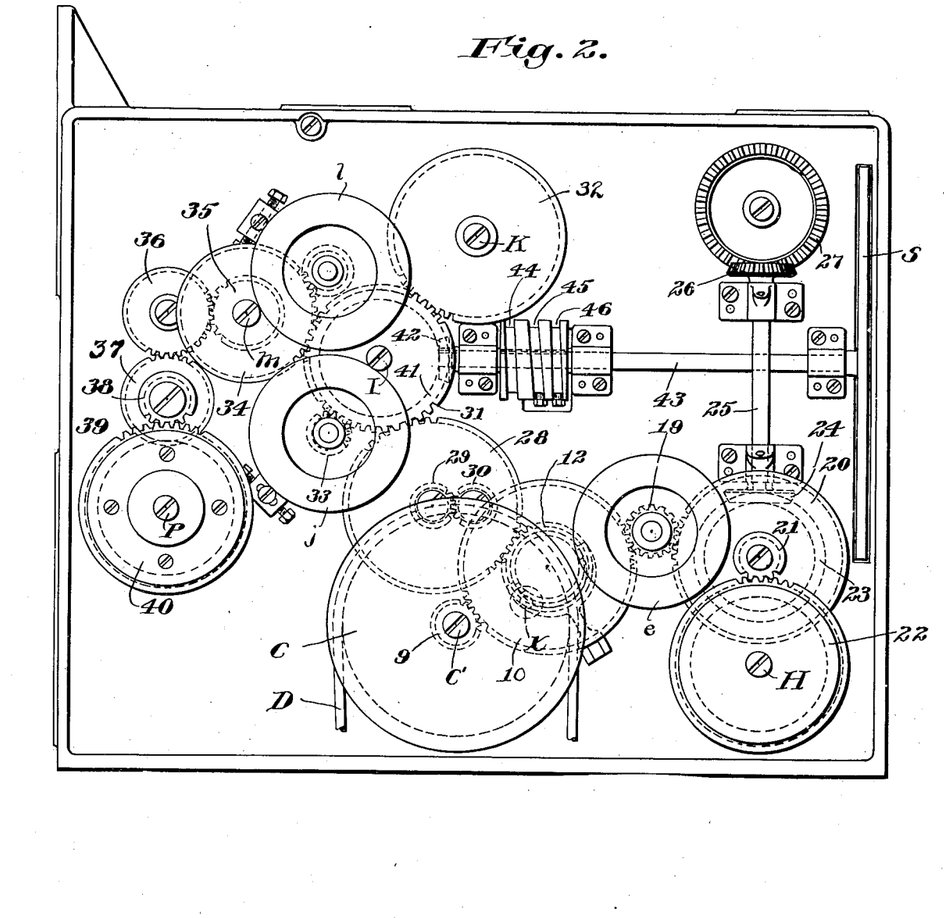
Fig. 2 is a rear elevation of the printer.
Figure 3:
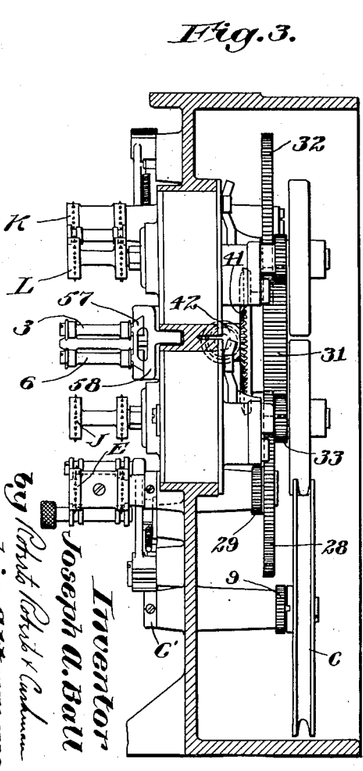
Fig. 3 is a section on line 3—3 of Fig. 1.
Figure 4:
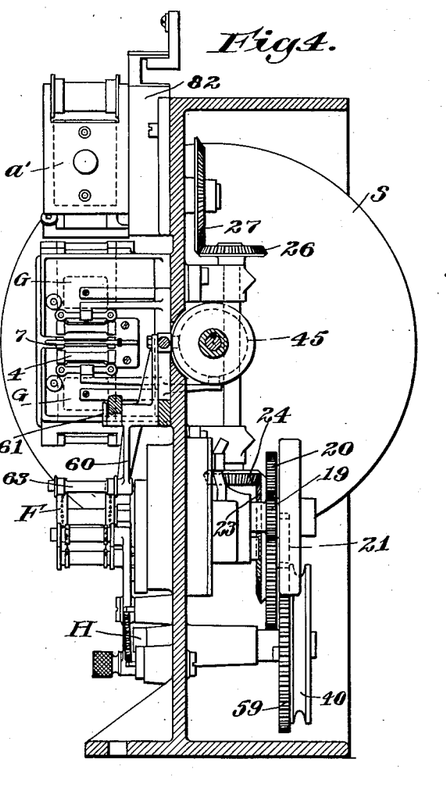
Fig. 4 is a section on line 4—4 of Fig. 1.
Figure 5:
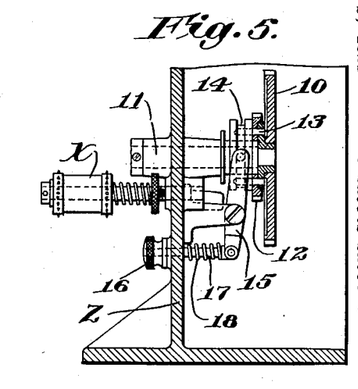
Fig. 5 is a section on line 5—5 of Fig. 1.
Figure 6:
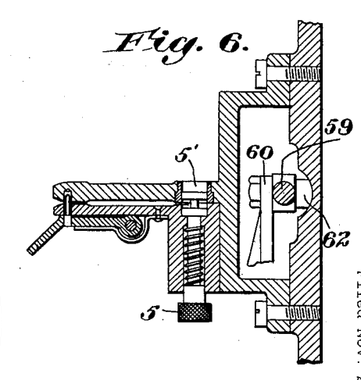
Fig. 6 is a section on line 6—6 of Fig. 1.

The mechanism for driving the movable parts of the printer are shown in Fig. 2 where C represents the main driving pulley actuating from an electrical motor or other source of power by a belt D, this pulley rotating shaft C' which carries a small gear 9 meshing with gear 10 keyed on shaft 11 (Figs. 1 and 5) which also carries the gear 12. Gear 12 is rotatably mounted on shaft 11 but is adapted to be clutched thereto by means of pins 13 movable longitudinally of the shaft 11 by means of a groove sleeve 14 arm 15 and actuator 16 which is threaded on link 17 and held against the outer face of the casing Z by means of spring 18, whereby the clutch is thrown out by the spring 18 when the actuator 16 is threaded outwardly along the link 17. The gear 10 meshes with the gear 19 on the shaft of sprocket wheel F (Fig. 1) which in turn meshes with gear 20 on the shaft of sprocket wheel B (Fig. 1), this shaft carrying a smaller gear 21 meshing with a larger gear 22 on the shaft H. Mounted at the side of gear 20 is a beveled gear 23 meshing with beveled gear 24 on shaft 25 which in turn drives the sprocket wheel R (Fig. 1) through beveled gears 26 and 27. The aforesaid gearing serves to drive the negative through the medium of sprocket wheels R and F.

The driving mechanism for the positives comprises a gear 28 meshing with gear 12 and rotating on shaft D (Fig. 1), this shaft carrying the smaller gear 29 which meshes with gear 30 and drives the sprocket wheel E (Fig. 1). The gear 28 meshes with gear 31 on shaft I. Gear 31 drives gear 32 which actuates sprocket K (Fig. 1), also with gear 33 which actuates sprocket J, also with gear 34 which is mounted on shaft M. Shaft M carries a smaller gear 35 meshing with gear 36 which drives sprocket wheel N (Fig. 1). Gear 36 meshes with gear 37 on the shaft which carries sprocket O (Fig. 1). This shaft also carries gear 38 meshing with gear 39 on shaft P. A pulley 40 is fast to gear 39 for driving parts of the machine not shown. Gear 31 carries on one side beveled gear 41 meshing with beveled gear 42 on shaft 43 which drives shutter S. Shaft 43 carries a cam having three cam grooves 44, 45, 46 for purposes hereinafter described.

The sprocket wheels F, J and L are driven intermittently through Geneva movements F', J' and L' (Fig. 1), these movements having the usual fly-wheels e, j and l shown in Fig. 2.

Figure 7:
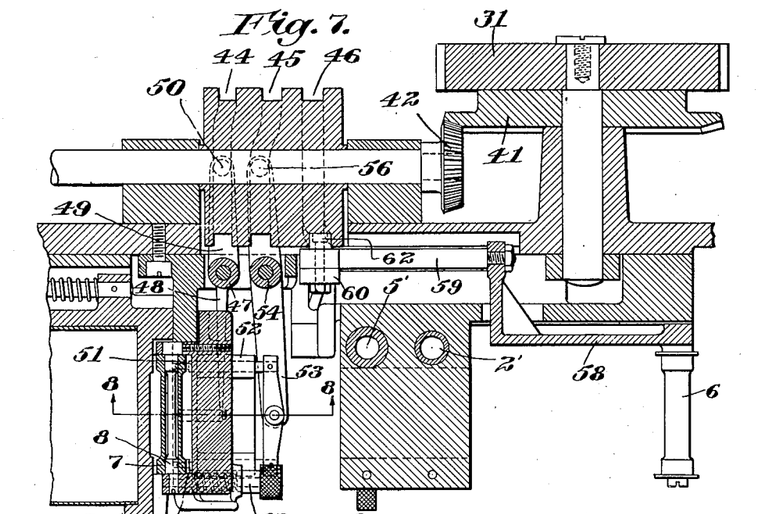
Fig. 7 is a section on line 7—7 of Fig. 1.

The mechanism for accurately positioning the films in the film gates comprises pressure plates Q and Q' mounted on tubular shaft 47 through arms 48 and 48' (Figs. 7 and 8). The shaft 47 has an arm 49 extending in the opposite direction from arms 48 and 48' and on the end of arm 49 is a cam roll 50 disposed in the cam groove 44 above referred to. The registering mechanism also comprises registering pins 51 which slide in guides 52 and are actuated by arms 53 mounted on tubular shaft 54, this shaft having an arm 55 carrying a cam roll 56 working in cam groove 45.

As above stated, the films are tensioned by tensioning means A, A' and A'' and in order to release this tension just prior to the advance of the registering pins 51 into the sprocket holes of the films, the following mechanism is provided: The rollers 3 and 6 are mounted on a dovetail slide 57 sliding in a fixed guide 58. This guide is connected through link 59 to the upper end of arm 60 pivoted at 61 (Figs. 1, 6, 7 and 8). The upper end of this arm carries a cam roll 62 working in cam groove 46. The lower end of arm 60 carries a roller 63 (Fig. 1) bearing against the negative film N beneath the film gates. When the arm 60 is oscillated in a clockwise direction (Fig. 1) the rollers 3 and 6 move to the left and the roller 63 to the right, thereby releasing the tension on the three films.

The cams 44, 45 and 46 are timed so that the parts operate in the following sequence: After the films stop the registering pins begin to advance, and after the tapered forward ends of the pins pass through the sprocket holes the tension is released, and after the pins are fully inserted the pressure plates Q and Q' are advanced to press the films in flatwise contact. After the images are printed, the pressure plates retract, the registering pins retract and the tension is reestablished.

Figure 9:
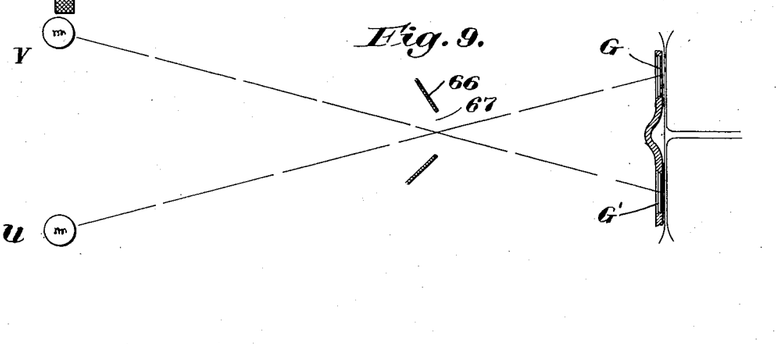
Fig. 9 is a diagrammatic view illustrating the relationship between the printing lights and film gates.

Separate lights U and V are provided for the respective film gates, the paths of which cross as shown in Fig. 9. These lights are enclosed in a lamp house (not shown) located at the left of Fig. 1 and the light paths are enclosed by means of a casing formed in two parts 64 and 65, the part 65 telescoping into the part 64 to facilitate threading films through the film gates. A partition 66, having a central opening 67, is provided immediately in advance of the shutter S and the lights are so positioned that their beams cross at the opening 67. This permits the lamps U and V being placed farther apart and also permits a single shutter to shutter both beams substantially simultaneously, the shutter being placed at or near the place where the beams cross.

Figures 10, 11:
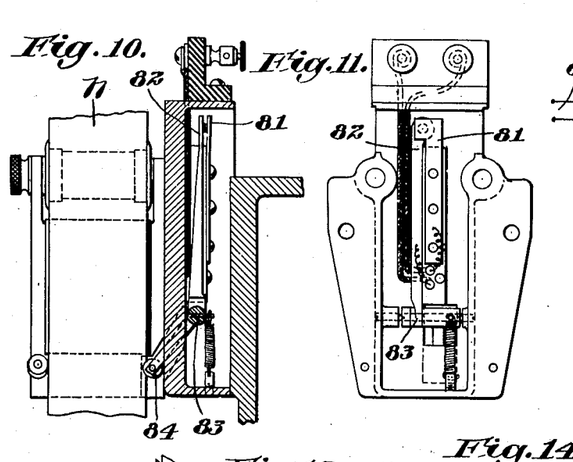
Fig. 10 is a section on line 10—10 of Fig. 1.
Fig. 11 is a rear elevation of the mechanism shown in Fig. 10, as viewed from the left of Fig. 10.
Figure 12:
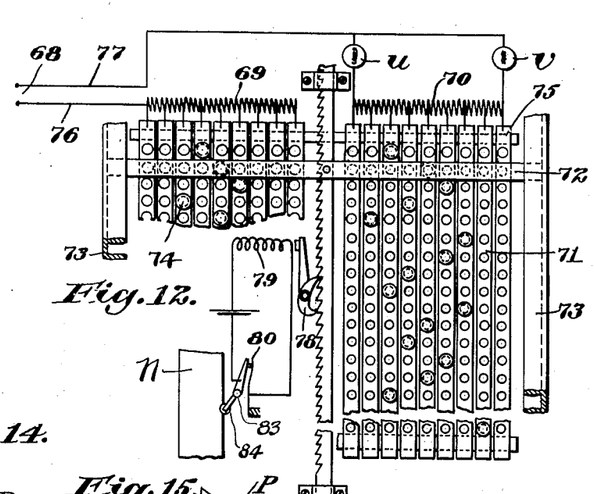
Fig. 12 is a diagrammatic view of means for automatically controlling the printing lights.

The mechanism for controlling the lights U and V, as illustrated in Figs. 10, 11 and 12, is constructed as follows: the lamps are connected to a source of current 68 through variable resistance 69 and 70. Taps from the resistance coils 69 and 70 connect with vertical bars 71 which have a series of openings to receive contact plugs 74. A contact bar 72 slides vertically in guides 73 in juxtaposition to the bars 71 so as to contact with plugs such as indicated at 74 in the openings 75. The circuit for the lamps is as follows: From one side of the source of current through conductor 76, thence through resistance 69, thence through one of the bars 71 to a plug 74 contacting with bar 72, thence through bar 72 to a plug 74 connecting with one of the taps of resistance 70, thence in parallel through the resistance 70 and lamps U and V back to the source of current through conductor 77.

The bar 72 is arranged to be stepped downwardly by means of an escapement mechanism 78 controlled by magnet 79 and switch 80. The switch 80 comprises two parts 81 and 82, the part 82 comprising an arm pivoted at 83 and carrying at its lower end a roller 84 rolling on the edge of the negative film N. The negative film is provided with notches in this edge at predetermined intervals and as one of these notches passes under roller 84, arm 82 moves in a clockwise direction (Figs. 10 and 12) closing switch 80 momentarily. This operates the escapement mechanism to step the bar 72 down one row of openings in the bars 71.

Notches are provided in the negative film at the points where the average intensity of the two printing lights should be varied and also at points where the relative intensity of the two printing lights should be varied. The plugs 74 are arranged in the left-hand bank of bars 71 in accordance with the desired variation in the average intensity of the printing light and the plugs are arranged in the right-hand bank of bars 71 in accordance with the desired variation in the relative intensity of the lights U and V. When it be desired to vary the average intensity without varying the relative intensity, succeeding plugs in the left-hand bank are laterally offset from each other while the plugs in the corresponding rows of the right-hand bank are placed one above the other, and vice versa. Consequently when the bar 72 moves downwardly from one plug to another plug laterally offset from the first plug, one of the resistances 69 and 70 is varied to control the average or relative intensity of the printing lights respectively.

Figure 13:
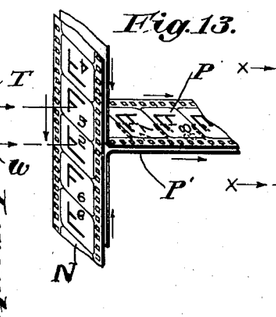
Fig. 13 is a perspective view of films showing their relationship in the region of the film gates and showing one method of printing.
Figure 14:
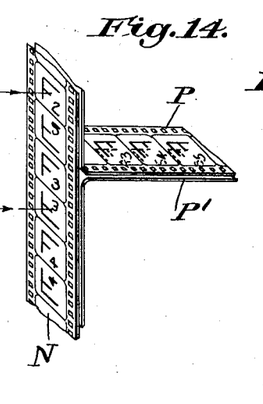
Fig. 14 is a similar view showing another method of printing.
Figure 16:
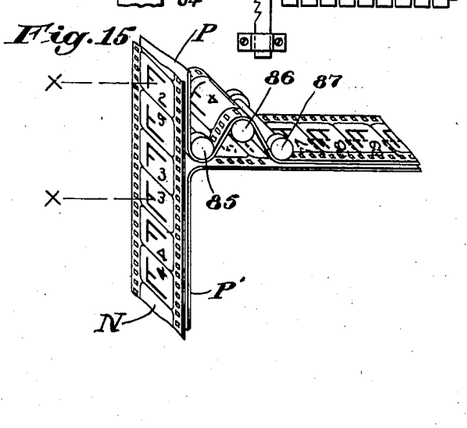

In Fig. 13 one method of printing the complemental images is illustrated in which the negative film N carries pairs of images $F_4$, $F_5$, $F_6$, etc., of which the images of each pair are arranged foot-to-foot in symmetrical reversed relationship longitudinally of the film. T and W represent the printing lights for the respective images, this figure as well as Figs. 14 and 15 illustrating the possibility of using separate lights without crossing their paths although it is to be understood that the paths may be crossed as above described. In Fig. 13 the images of each complemental set, which are juxtaposed, are printed simultaneously at equal distances from opposite sides of the horizontal plane between the juxtaposed portions of the positives P and P'. In thus printing juxtaposed images it will be understood that the film-gates should be juxtaposed or made in the form of a suitable double-size film-gate instead of being separated as above described.

In Fig. 14 the arrangement is that of the embodiment above described in detail except that the paths of the printing lights are not shown as being crossed. With the film-gates separated by two intervening picture spaces an image of one pair of complemental images is printed in the lower film-gate at the same time that a different image of another set is printed in the upper film-gate. As shown in Fig. 14 the images printed simultaneously are in adjacent complemental sets, the inverted image of set three being in printing position in the lower film-gate while the upright image of set two is in printing position in the upper film-gate.

With this arrangement the images of each complemental set do not register with each other when the films pass into parallel juxtaposition if the horizontal plane between the juxtaposed portions of the positives is halfway between the two film-gates. On the contrary the upper positive P is one picture space ahead of the lower positive P'. In such case the perforators 2 and 5 are employed to perforate the respective films at corresponding points, as for example, immediately before or immediately after the series of images are printed; for example, after the machine has been threaded, the perforators 2 and 5 may be pressed toward the films to perforate same before the machine is started. With these perforators spaced apart a distance equal to one picture space, they will perforate the respective positives at corresponding points so that if the films are subsequently started through a cementing machine (such as described in prior application Sr. No. 500,842 filed Sept. 15, 1921) with the perforations in registry, the complemental images will register with each other.

If it is desired to have the film-gates separated and at the same time have the complemental images register with each other when the positives are brought into parallel juxtaposition, the paths of the positive films from the film gates may be made of different lengths as for example by the use of rollers 85, 86 and 87 as shown in Fig. 15, the path of the upper positive being made sufficiently longer to bring the complemental images in registry beyond roller 87.

At times it is desirable to advance the negative film without advancing the positive films, as for example when it is desired to omit a section of the negative film. With the present machine this can be accomplished without unthreading the films, merely by throwing out the clutch 16, advancing the negative the desired distance and then throwing the clutch in again.

For the sake of simplicity and clarity the film printed from is herein referred to as the negative and the films printed upon are referred to as positives. However, it will be understood that inasmuch as negatives can be printed from positives equally well according to the present invention, as for example in making negatives from master positives as in certain known processes, the terms negatives and positives are to be construed illustratively and not definitively.

I claim:

1. The method of making complemental cinematographic films which comprises feeding a plurality of films along angular paths the angles of which are adjacent, the paths on one side of the angles extending in the same general direction, and concomitantly forming complemental series of images on the respective films on the other side of the angles.

2. The method of making complemental cinematographic films which comprises feeding a plurality of films along angular paths the angles of which are adjacent and the center lines of which lie in the same plane on both sides of the angles, the paths on one side of the angles extending in the same general direction, and concomitantly forming complemental series of images on the respective films on the other side of the angles.

3. The method of making complemental cinematograhic films which comprises feeding a plurality of films along angular paths with the emulsion sides of the films on the inner sides of the angular paths, the paths on one side of the angles extending in the same general direction, and concomitantly forming complemental series of images on the respective films on the other side of the angles by exposing the films through their backs.

4. The method of making complemental cinematographic films which comprises feeding a plurality of films along angular paths the angles of which are adjacent, the paths on one side of the angles extending in opposite directions, and concomitantly forming complemental series of images on the respective films on said side of the angles.

5. The method of making complemental cinematographic films which comprises feeding a plurality of films along angular paths the angles of which are adjacent, the paths on one side of the angles extending in opposite directions, and simultaneously forming the complemental images on the respective films on said side of the angles adjacent to the angles.

6. The method of making complemental cinematographic films which comprises feeding two films toward each other in the same plane and thence laterally relatively to said plane, and concomitantly forming complemental series of images on the films respectively while in said plane.

7. The method of making complemental cinematographic films which comprises feeding two films toward each other in the same plane and thence laterally to the same side of said plane, and concomitantly forming complemental series of images on the films respectively while in said plane.

8. The method of making complemental cinematographic films which comprises feeding two films toward each other in the same plane and thence laterally in parallel juxtaposition, and concomitantly forming complemental series of images on the films respectively while in said plane.

9. The method of making complemental cinematographic films which comprises feeding two films toward each other in the same plane and thence laterally to the same side of said plane, and concomitantly forming complemental series of images on the films respectively while in said plane, the images of the series being formed in reversed relation to each other so that they are not reversed when they pass to the same side of said plane.

10. The method of making complemental cinematographic films which comprises feeding two films toward each other in the same plane and thence laterally in parallel juxtaposition, and concomitantly forming complemental series of images on the films respectively while in said plane, the images of the series being formed in reversed relation to each other longitudinally of the film so that they are directed in the same direction when they pass into parallel juxtaposition.

11. The method of making complemental cinematographic films which comprises feeding two films toward each other and thence laterally with their backs directed toward each other, and concomitantly forming complemental series of images on the films respectively immediately before they pass laterally as aforesaid, the films being exposed through their backs.

12. The method of making complemental cinematographic films which comprises feeding two films toward each other and thence laterally back-to-back in parallel juxtaposition, and concomitantly forming complemental series of images on the films respectively immediately before they pass laterally as aforesaid, the films being exposed through their backs.

13. The method of making complemental cinematographic films which comprises feeding two films along paths which approach each other and thence proceed in the same general direction, and concomitantly forming complemental series of images on the films respectively in the portions of the paths which approach each other.

14. The method of making complemental cinematographic films which comprises feeding two films along paths which approach each other and thence proceed in parallel juxtaposition and concomitantly forming complemental series of images on the films respectively immediately in advance of the parallel portions of the paths.

15. The method of making complemental cinematographic films which comprises feeding two films along paths which approach each other, concomitantly forming complemental series of images on said films respectively while in said paths, and thence feeding the films in parallel juxtaposition, the images being so positioned on the films that corresponding points thereof register when the films are fed into parallel juxtaposition.

16. The method of making complemental cinematographic films which comprises feeding two films along angular paths the angles of which are adjacent, the paths on one side of the angles extending in different directions, feeding film bearing complemental series of images parallel to said paths on said side of the angles, and concomitantly printing said complemental series on said two films respectively.

17. The method of making complemental cinematographic films which comprises feeding two films toward each other in the same plane and thence laterally to the same side of said plane, feeding film bearing complemental series of images parallel to said plane and concomitantly printing said complemental series on said two films respectively.

18. The method of making complemental cinematographic films which comprises feeding two films toward each other in the same plane and thence laterally in parallel juxtaposition, feeding film bearing complemental series of images parallel to said plane, and concomitantly printing the complemental series on said two films respectively while in said plane.

19. The method of making complemental cinematographic films which comprises feeding two films along paths which approach each other into juxtaposition and thence proceed in the same general direction, feeding film bearing complemental series of images parallel to the portions of said paths which approach each other, and concomitantly printing the complemental series on said two films respectively in said parallel portions.

20. The method of making complemental cinematographic films which comprises feeding two films along paths which approach each other into juxtaposition and thence proceed laterally in parallel juxtaposition, feeding film bearing complemental series of images parallel to the portions of said paths which approach each other, and concomitantly printing the complemental series on said two films respectively in said parallel portions.

21. The method of making complemental cinematographic films which comprises feeding two films along paths which approach each other and thence feeding the films in parallel juxtaposition back-to-back, and concomitantly forming complemental series of images on the films respectively by exposing them through the backs in the portions of said paths which approach each other.

22. The method of making complemental cinematographic films which comprises feeding two films along paths which approach each other and thence proceed in the same general direction, feeding film bearing relatively inverted series of complemental images parallel to the portions of said paths which approach each other, and concomitantly printing the inverted series on said two films respectively so that when the films proceed in the same general direction the printed images are not inverted relatively to each other.

23. The method of making complemental cinematographic films which comprises concomitantly printing complemental series of images on separate films respectively from a single width film bearing a plurality of complemental series, and subsequently bringing the films into juxtaposition with their complemental images in registry.

24. The method of making complemental cinematographic films which comprises the step of concomitantly printing complemental series of images on separate films respectively from one film bearing a plurality of complemental series.

25. The method of making complemental cinematographic films which comprises feeding a plurality of films along paths at least in part adjacent and concomitantly printing complemental series of images on said films respectively from one film bearing a plurality of complemental series.

26. The method of making complemental cinematographic films which comprises feeding a plurality of films along paths which in part are in parallel juxtaposition, and concomitantly forming complemental series of images on the films respectively in such relationship that the images which are complemental to each other register with each other in the parallel part of the paths.

27. The method of making complemental cinematographic films which comprises feeding positive films and a negative film bearing complemental series of negatives along paths in part adjacent, concomitantly printing the complemental series on the positive films, and automatically varying the printing light in proportion to variations in the average density of the complemental negatives.

28. The method of making complemental cinematographic films which comprises feeding positive films and a negative film bearing complemental series of negatives along paths in part adjacent, concomitantly printing the complemental series on the positive films, and automatically varying the printing light in proportion to variations in the relative density of the complemental negatives.

29. The method of making complemental cinematographic films which comprises feeding positive films and a negative film bearing complemental series of negatives along paths in part adjacent, concomitantly printing the complemental series on the positive films, and automatically varying the printing light in proportion to variations in both the average density and the relative density of the complemental negatives.

30. The method of making complemental cinematographic films which comprises feeding positive films and a negative film bearing complemental series of negatives along paths in part adjacent, concomitantly printing complemental series of positives on the positive films from the series of negatives, and automatically varying the average exposure of the complemental positives.

31. The method of making complemental cinematographic films which comprises feeding positive films and a negative film bearing complemental series of negatives along paths in part adjacent, concomitantly printing complemental series of positives on the positive films from the series of negatives, and automatically varying the relative exposure of the complemental positives.

32. The method of making complemental cinematographic films which comprises feeding positive films and a negative film bearing complemental series of negatives along paths in part adjacent, concomitantly printing complemental series of positives on the positive films from the series of negatives, and automatically varying the average exposure of the complemental positives substantially independently of the relative exposure thereof.

33. The method of making complemental cinematographic films which comprises feeding positive films and a negative film bearing complemental series of negatives along paths in part adjacent, concomitantly printing complemental series of positives on the positive films from the series of negatives, and automatically varying the relative exposure of the complemental positives substantially independently of the image exposure thereof.

34. The method of making complemental cinematographic films which comprises feeding positive films and a negative film bearing complemental series of negatives along paths in part adjacent, concomitantly printing complemental series of positives on the positive films from the series of negatives, and automatically varying the average exposure of the complemental positives substantially independently of the relative exposure thereof and automatically varying the relative exposure of the complemental positives substantially independently of the average exposure thereof.

35. Apparatus for printing complemental cinematographic films comprising mechanism for feeding positive films and film bearing complemental series of negatives along paths in part adjacent, means for concomitantly printing complemental series of positives on the positive film from the series of negatives, and means for conjointly varying the exposure of the complemental positives, said first means including a light for each series of positives, and said last means including a light controller responsive to variations in the negative film.

36. Apparatus for printing complemental cinematographic films comprising mechanism for feeding positive film and film bearing complemental series of negatives along paths in part adjacent, means for concomitantly printing complemental series of positives on the positive film from the series of negatives, and means for automatically varying the exposure of the complemental positives, said first means including a light for each series of positives, and said last means including a light controller for varying the average exposure of the lights in response to variations in the negative film.

37. Apparatus for printing complemental cinematographic films comprising mechanism for feeding positive film and film bearing complemental series of negatives along paths in part adjacent, means for concomitantly printing complemental series of positives on the positive film from the series of negatives, and means for automatically varying the exposure of the complemental positives, said first means including a light for each series of positives, and said last means including a light controller for varying the relative exposure of the lights in response to variations in the negative film.

38. Apparatus for printing complemental cinematographic films comprising mechanism for feeding positive film and film bearing complemental series of negatives along paths in part adjacent, means for concomitantly printing complemental series of positives on the positive film from the series of negatives, and means for automatically varying the exposure of the complemental positives, said first means including a light for each series of positives, and said last means including light controllers for varying both the average exposure and the relative exposure of the lights in response to variations in the negative film.

39. Apparatus for printing complemental cinematographic films comprising means for feeding a plurality of films along paths which in part are in parallel juxtaposition, means for concomitantly printing from negative film complemental series of images on the films respectively in such relationship that the images which are complemental to each other register with each other, said last means including a light for each series of images, and film-controlled means for separately varying said lights in proportion to variations in the density of the images.

40. Apparatus for printing complemental cinematographic films comprising means for feeding a plurality of films along paths which in part are in parallel juxtaposition, and means for concomitantly printing from negative film, in non-parallel parts of the paths complemental series of images on the films, respectively, in such relationship that the images which are complemental to each other register with each other in the parallel parts of said paths.

41. Apparatus for printing complemental cinematographic films comprising mechanism for feeding a plurality of films and film bearing complemental series of images along paths in part adjacent and in part separate, and means for concomitantly printing said series on said plurality of films respectively in the separate parts of said paths.

42. Apparatus for printing complemental cinematographic films comprising mechanism for feeding a plurality of films and one film bearing complemental series of images along paths in part adjacent, and means for concomitantly printing said series from said one film on said plurality of films respectively.

43. Apparatus for printing complemental cinematographic films comprising mechanism for feeding a plurality of films along divergent paths, and film bearing complemental series of images in parallelism with said paths with the center lines of all the films in the same plane, and means for concomitantly printing said series on said plurality of films respectively.

44. Apparatus for printing complemental cinematographic films comprising mechanism for feeding a plurality of films and one film bearing complemental series of images in parallelism with their center lines in the same plane, and means for concomitantly printing said series from said one film on said plurality of films respectively.

45. Apparatus for printing complemental cinematographic films comprising mechanism for feeding a plurality of films and film bearing complemental series of images along paths in part adjacent, and means for concomitantly printing said series on said plurality of films respectively through their backs.

46. Apparatus for printing complemental cinematographic films comprising mechanism for feeding a plurality of films and film bearing complemental series of images along paths in part adjacent, means for concomitantly printing said series on said plurality of films respectively through their backs, and means for subsequently bringing the films into parallel juxtaposition back-to-back.

47. Apparatus for printing complemental cinematographic films comprising mechanism for feeding a plurality of films and film bearing complemental series of images along paths in part adjacent, means for concomitantly printing said series on said plurality of films respectively through their backs, and means for continually bringing the films into parallel juxtaposition back-to-back with the complemental images in registry in subsequent positions of their paths.

48. Apparatus for printing complemental cinematographic films comprising mechanism for feeding a plurality of films and film bearing complemental series of images along paths all of which are in part parallel to each other, and means for concomitantly printing said series on said plurality of films respectively in said parallel portions of the paths.

49. Apparatus for printing complemental cinematographic films comprising mechanism for feeding a plurality of films along paths approaching each other and thence extending in the same general direction, mechanism for feeding a film bearing complemental series of images in parallelism with the portions of said paths which approach each other, and means for concomitantly printing said series on said plurality of films respectively in said portions of the paths.

50. Apparatus for printing complemental cinematographic films comprising mechanism for feeding a plurality of films along paths approaching each other and thence extending in the same general direction, mechanism for feeding a film bearing complemental series of images in parallelism with the portions of said paths which approach each other, and means for concomitantly printing said series on said plurality of films respectively in said portions of the paths, said printing means comprising a separate light for each of said plurality of films, and the paths of the lights being crossed.

51. Apparatus for printing complemental cinematographic films comprising mechanism for feeding a plurality of films along paths approaching each other and thence extending in the same general direction, mechanism for feeding a film bearing complemental series of images in parallelism with the portions of said paths which approach each other, means for concomitantly printing said series on said plurality of films respectively in said portions of the paths, said printing means comprising a separate light for each of said plurality of films, and the paths of the lights being crossed, and a shutter crossing said paths near where they cross.

52. The method of reproducing on separate secondary films complemental series of images reversed with respect to each other on a single primary film which comprises printing one series on one secondary film and printing the other series on another secondary film, one secondary film being advanced in the same direction as the primary film and the other secondary film being advanced in a direction opposite to that of the primary film in the printing operations.

53. The method of reproducing complemental series of images, the complemental images of the respective series being reversed with respect to each other on a single film, which comprises printing one series of images with the printed film advancing in the same direction as said single film and printing another series of images with the printed film advancing in a direction opposite to that of said single film, thereby to superpose the complemental printed images in registry.

Signed by me at Boston, Mass., this 29th day of October 1921.

JOSEPH A. BALL.